US009448135B2

(12) United States Patent
Syed et al.

(10) Patent No.: US 9,448,135 B2
(45) Date of Patent: Sep. 20, 2016

(54) TORQUE ERROR DETECTION AND TORQUE ESTIMATION SYSTEM

(71) Applicant: FORD GLOBAL TECHNOLOGIES, LLC, Dearborn, MI (US)

(72) Inventors: Fazal Urrahman Syed, Canton, MI (US); Daniel Richard Luedtke, Beverly Hills, MI (US); Bader M. Badreddine, Dearborn, MI (US); Susan Rebecca Cikanek, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 14/332,893

(22) Filed: Jul. 16, 2014

(65) Prior Publication Data

US 2016/0018287 A1 Jan. 21, 2016

(51) Int. Cl.
*G01M 15/04* (2006.01)
*G01L 3/10* (2006.01)
*G01L 3/24* (2006.01)
*H02P 21/14* (2016.01)

(52) U.S. Cl.
CPC ............ *G01M 15/044* (2013.01); *G01L 3/109* (2013.01); *G01L 3/24* (2013.01); *G01M 15/042* (2013.01); *H02P 21/14* (2013.01)

(58) Field of Classification Search
CPC .. B60W 10/08; F02D 2250/18; F02D 29/06; G01L 3/109; G01L 3/24; G01M 15/042; G01M 15/044
USPC ...................................................... 73/114.15
See application file for complete search history.

(56) References Cited

U.S. PATENT DOCUMENTS

| 6,453,222 | B1* | 9/2002 | Lasson | B60K 6/365 180/65.1 |
|---|---|---|---|---|
| 7,116,068 | B2* | 10/2006 | Boesch | B60K 6/445 318/400.15 |
| 7,116,077 | B2* | 10/2006 | Raftari | B60K 6/445 318/767 |
| 7,268,442 | B2* | 9/2007 | Syed | B60K 6/44 180/65.25 |
| 7,963,353 | B2 | 6/2011 | Tatematsu et al. | |
| 8,056,660 | B2* | 11/2011 | Imura | B60K 6/44 180/65.24 |
| 8,395,350 | B2 | 3/2013 | Sloan et al. | |
| 8,463,474 | B2* | 6/2013 | Jang | B60K 6/48 701/22 |
| 8,565,930 | B2 | 10/2013 | Miwa | |
| 8,935,026 | B2* | 1/2015 | Matsushita | B60K 6/448 475/5 |
| 8,935,032 | B2* | 1/2015 | Kato | B60T 8/175 701/22 |
| 9,291,218 | B2* | 3/2016 | Hata | F16D 48/06 |
| 2003/0193310 | A1* | 10/2003 | Raftari | B60K 6/365 318/798 |

* cited by examiner

*Primary Examiner* — Freddie Kirkland, III
(74) *Attorney, Agent, or Firm* — David Kelley; Brooks Kushman P.C.

(57) ABSTRACT

A vehicle may include a powertrain having an engine and a generator coupled to a driveshaft, an inverter configured to provide phase currents to the generator, and a controller programmed to output a fault condition based on first and second generator torques, the first generator torque being based on an engine torque and the second generator torque being based on no more than two phase currents of the generator.

16 Claims, 5 Drawing Sheets

TORQUE ERROR DETECTION AND TORQUE ESTIMATION SYSTEM

TECHNICAL FIELD

Described herein is an torque error detection and estimation system.

BACKGROUND

Hybrid Electric Vehicles (HEVs) often use a power split architecture to combine combustion torque created by the engine and the electric torque generated by two electric machines to drive the vehicle. The electrical machines may include a generator and a motor. Current sensors at the inverters of each electrical machine may measure phase currents for both the motor inverter and the generator inverter. These phase currents may be used to determine whether a torque error has occurred within the system.

SUMMARY

A vehicle may include a powertrain having an engine and a generator coupled to a driveshaft, an inverter configured to provide phase currents to the generator, and a controller programmed to output a fault condition based on first and second generator torques, the first generator torque being based on an engine torque and the second generator torque being based on no more than two phase currents of the generator.

A torque error detection system may include a controller including input communication channels configured to receive an engine torque and no more than two phase currents of a generator, output communication channels configured to output a fault condition, and control logic configured to generate the fault condition in response to a difference between first and second generator torques exceeding a threshold, wherein the first generator torque is based on the engine torque and the second generator torque is based on the two phase current.

A method for detecting generator torque error may include outputting a fault condition in response to a difference between first and second generator torques exceeding a threshold, wherein the first torque is based on a steady state engine torque, an engine acceleration, and a generator acceleration, and wherein the second torque is based on generator phase currents.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Hybrid Electrical Vehicles (HEVs) often use a power split drive train architecture to combine a combustion torque generated by the engine and an electric torque generated by two electric machines (e.g., a generator and motor). The generator and motor may be permanent-magnet AC motors with three-phase current input. Inverters are used to power the motor and the generator to deliver the desired torque. Current sensors are often used for controlling and monitoring the torque. Current methods may require three current sensors to be used in order to perform a checksum of the phase currents detected by the sensors. If a problem exists with the torque or sensors, the sum of the currents will not be zero or near zero. This method, however, requires three phase current values, thus requiring three current sensors. This method also only detects current sensor fault without directly detecting a generator torque error.

Disclosed herein is a system for estimating a generator torque by using two of the phase currents of the generator. Another estimated generator torque may be determined using the torque of the engine. These estimated generator torques may then be compared to establish a torque error. If this torque error exceeds a predetermined error value, then a generator torque fault may be established. The disclosed system only requires two current sensors at the generator. The need for an additional third sensor is unnecessary, thus eliminating a component thereby reducing cost, weight, space and increasing reliability. Further, the disclosed system detects errors relating to generator torque without using phase current imbalance. The generator torque fault may be due to failures of the current sensors as well as other generator torque conditions that may cause torque errors. The system may reduce the probability that a generator current sensor will fail by up to 33%. Since three current sensors are required for the present design, and each current sensor has a chance to fail or one out of three chance of failure, eliminating one current sensor represents a ⅓ less chance of failure or approximately 33%.

Figure 1:
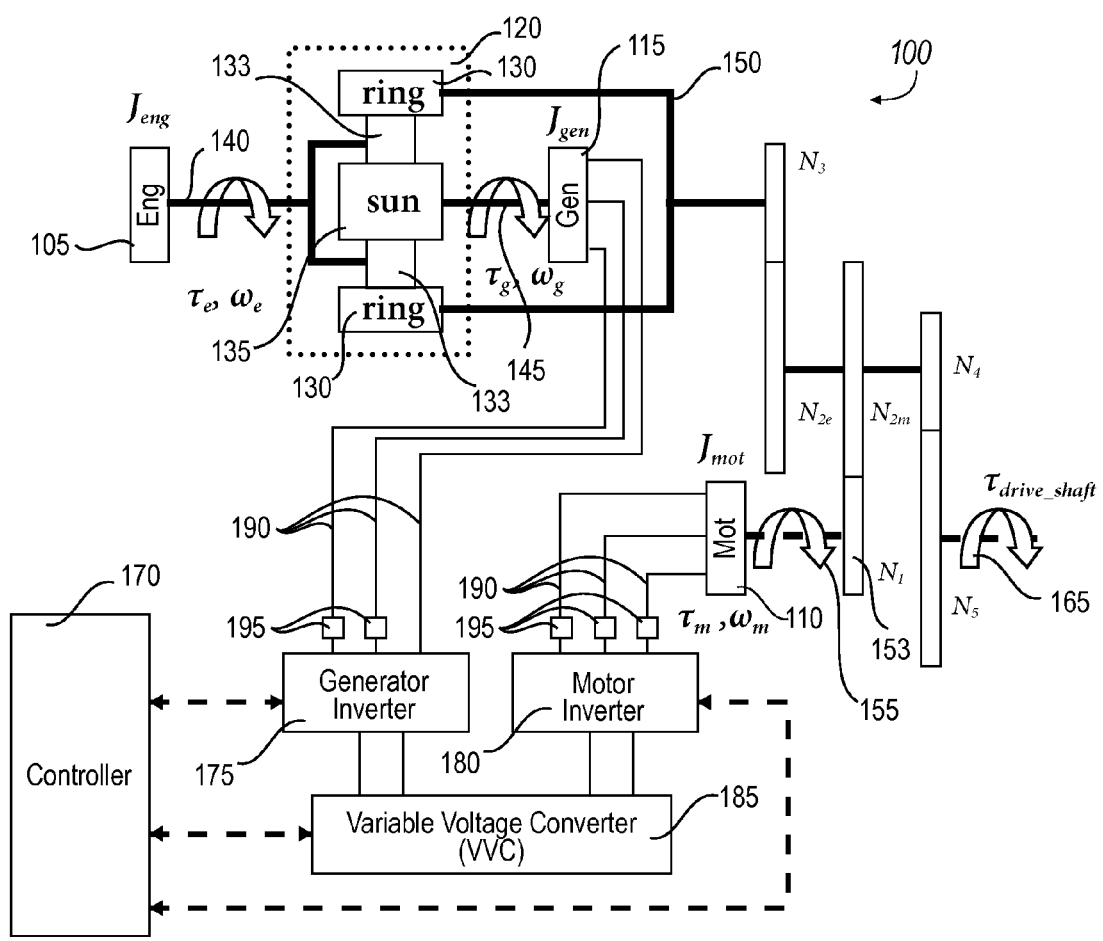
FIG. 1 is an exemplary drive train for a power split system of a vehicle.

FIG. 1 is an exemplary drive train for a power split system 100 of a vehicle (not shown) for combining the combustion torque generated by an engine 105 and the electrical torque generated by a motor 110 and generator 115. The motor 110 and the generator 115 may be electric machines being permanent-magnetic AC motors with three-phase current inputs. The engine 105 and the generator 115 may be connected by a planetary gear set 120. The gear set 120 may include a ring gear 130, a carrier 133 and a sun gear 135. The gear set 120 may provide various gear ratios such as a motor-to-ring gear ratio $k_{m2r}$, a ring-to-carrier ratio $k_{r2c}$, and a sun-to-carrier gear ratio $k_{s2c}$. The generator 115 may be connected directly to the sun gear 135. The rings 130 may be connected to a countershaft 150, which may drive the vehicle directly by a fixed ratio. A motor gear 153 on a motor shaft 155 may be meshed with a fixed ratio. The motor 110 may be connected to a drive shaft 165 on the vehicle. The drive shaft 165 may transmit torque from the motor 110 and or engine 105 to the wheels of the vehicle.

The system 100 may include a Motor Generator Control Unit (MGCU) controller 170 in communication with a generator inverter 175 and a motor inverter 180. The controller 170 may include input communication channels and output communication channels and may control the inverters 175, 180 to drive the motor 110 and/or generator 115 at desired torques. The inverters 175, 180 may be interfaced directly to a high-voltage battery of the vehicle or through a variable voltage converter (VVC) 185. The controller 170 may be a computer configured to perform the processes disclosed herein via control logic. It may be coupled to a memory (not shown). The controller 170, and/or memory thereof, may produce and maintain motor and generator values. The engine may also have a separate controller (not shown) that produces engine values. These values may be specific to the motor 110, generator 115 and engine 105. The values may be constant coefficients as well as real-time or near real-time variables. The values may be received from sensors within the system 100. The values may also be received from external sources. Some values may be derived values based on other received or saved values. For example, an engine acceleration $a_e$ may be calculated based on a motor acceleration $a_m$ and a generator acceleration $a_g$.

The controller 170 uses two phase currents $I_a$, $I_b$ received from the sensors 195 to control each the motor 110 and generator 115 and to deliver the desired torque via the inverters 175, 180. The phase currents may be delivered in the form of a line 190, as shown in FIG. 1. The line may be a wire capable of transmitting current. A wye configuration may be used. At least two of the lines 190 connected to the generator inverter 175 may include at least one phase current sensor 195. Each of the three of the lines 190 connected to the motor inverter 180 may include at least one phase current sensor 195. The phase current may be detected on at least two of the lines (e.g., phase currents $I_a$ $I_b$.) Traditionally a third current sensor 195 may be arranged on the third line 190. This third sensor 195 would not drive the torque, but would be used in performing a checksum of the three phase currents for current sensor failure detection. In the current implementation described herein, only two sensors are required for estimating the generator torque and detecting a failure. The current sensors may be any standard sensor for AC electric machine field control.

Each of the sensors 195 may provide a phase current value back to the controller 170. The phase current value may indicate the phase current on the respective line 190. The controller 170 may catalog each of the received phase currents (e.g., phase currents $I_a$, $I_b$.) The phase current values may be derived from a phase current reading at the sensors 195. For example, a first phase current $I_a$, and a second phase current $I_b$, may be transmitted from the current sensor to the controller 170. The phase currents $I_a$, $I_b$ may represent the machine electrical currents and may be used to calculate a third phase current. The three phase currents are each 120 degrees apart such that $I_a+I_b+I_c=0$. Thus, if two phase currents are known or sensed by the sensors 195, a third may be calculated. Field Orientated Control is a standard control method used to control three phase machines. Using Field Orientated Control, the three phase currents may be used to calculate two equivalent phase currents to derive equations representative of the machine electrical circuits. The two phase currents may be a direct axis current (field current) and a quadrature axis current (torque current). These currents allow the three phase machine to be controlled in a similar manner to a DC machine.

The following transformation may be used:

$$I_d = \frac{2}{3}\left(I_a \sin(wt) + I_b \sin\left(wt - \frac{2\pi}{3}\right) + I_c \sin\left(wt + \frac{2\pi}{3}\right)\right) \quad \text{Eq. 1}$$

$$I_q = \frac{2}{3}\left(I_a \cos(wt) + I_b \cos\left(wt - \frac{2\pi}{3}\right) + I_c \cos\left(wt + \frac{2\pi}{3}\right)\right) \quad \text{Eq. 2}$$

$$I_o = \frac{1}{3}(I_a + I_b + I_c) \quad \text{Eq. 3}$$

where $\omega$=rotation speed (in rad/s) of the rotating frame. In the case of a synchronous machine, the stator quantities are referred to the rotor. $I_d$ and $I_q$ represent the two DC currents flowing in the two equivalent rotor windings (d winding directly on the same axis as the field winding, and q winding on the quadratic axis), producing the same flux as the stator $I_a$, $I_b$, and $I_c$ currents.

Figure 2:
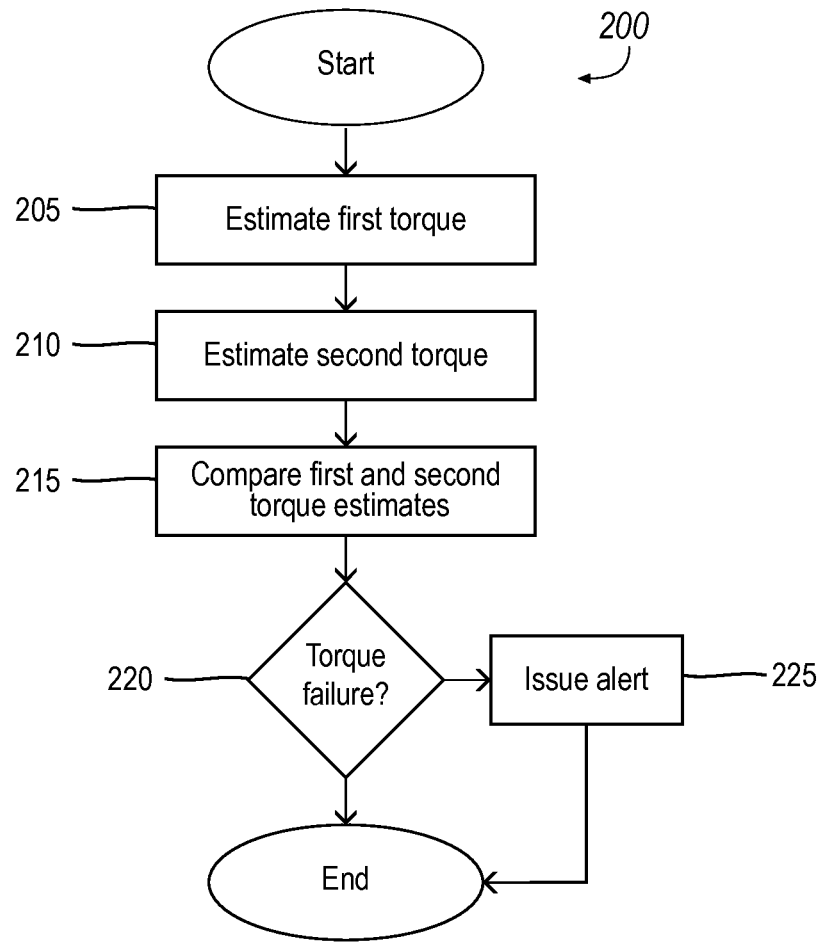
FIG. 2 is an exemplary process for determining whether a generator torque fault exists.

FIG. 2 is an exemplary process 200 for determining whether a generator torque fault exists. The process begins at block 205 where a first estimated torque $T_{G1}$ is determined. The first estimated torque $T_{G1}$ may be determined based on a plurality of engine, motor and generator values. These values may be pre-established constants specific to the device. The values may also be real-time variables detected by various sensors throughout the system 100. One of the values used to calculate the first estimated torque may be an engine torque $T_e$. The calculation of the first estimated torque $T_{G1}$ is described in more detail below with respect to FIG. 3.

At block 210, a second estimated torque $T_{G2}$ is determined. The second estimated torque $T_{G2}$ may also be determined based on the plurality of values. The second estimated torque $T_{G2}$ may be calculated, in part, based on the direct and quadrature currents (e.g., $I_d$ and $I_q$) acquired from the MGCU controller 170.

At block 215, the first estimated torque $T_{G1}$ and the second estimated torque $T_{G2}$ may be compared to one another to generate a comparison value $T_{g\_err}$. The torques $T_{G1}$, $T_{G2}$ may be compared by taking the difference between the two. The torques $T_{G1}$, $T_{G2}$ may also be compared by taking a ratio of one torque to another.

At block 220, the controller 170 may determine whether a generator torque fault exists by comparing the resultant comparison value (or torque error) $T_{g\_err}$ (either the difference or the ratio) with a predefined threshold. The predefined threshold may be a predetermined value configured to benchmark when a torque error may occur. In one example, a predefined threshold may be approximately 30 Nm. An unintended vehicle acceleration of 0.1 g in neutral may have a generator torque of 38 Nm, thus exceeding the predefined threshold and indicating that a torque error may have occurred.

If the resultant error value $T_{g\_err}$ is above the predefined threshold for a predefined period of time, a generator torque fault may exist and the process 200 proceeds to block 225. If not, the process 200 ends. At block 225 an alert may be issued to on board diagnostics (OBD) indicating that a torque failure may have occurred and that service may be necessary. In addition, a limited operating action may occur such as disabling the generator actuator.

Figure 3:
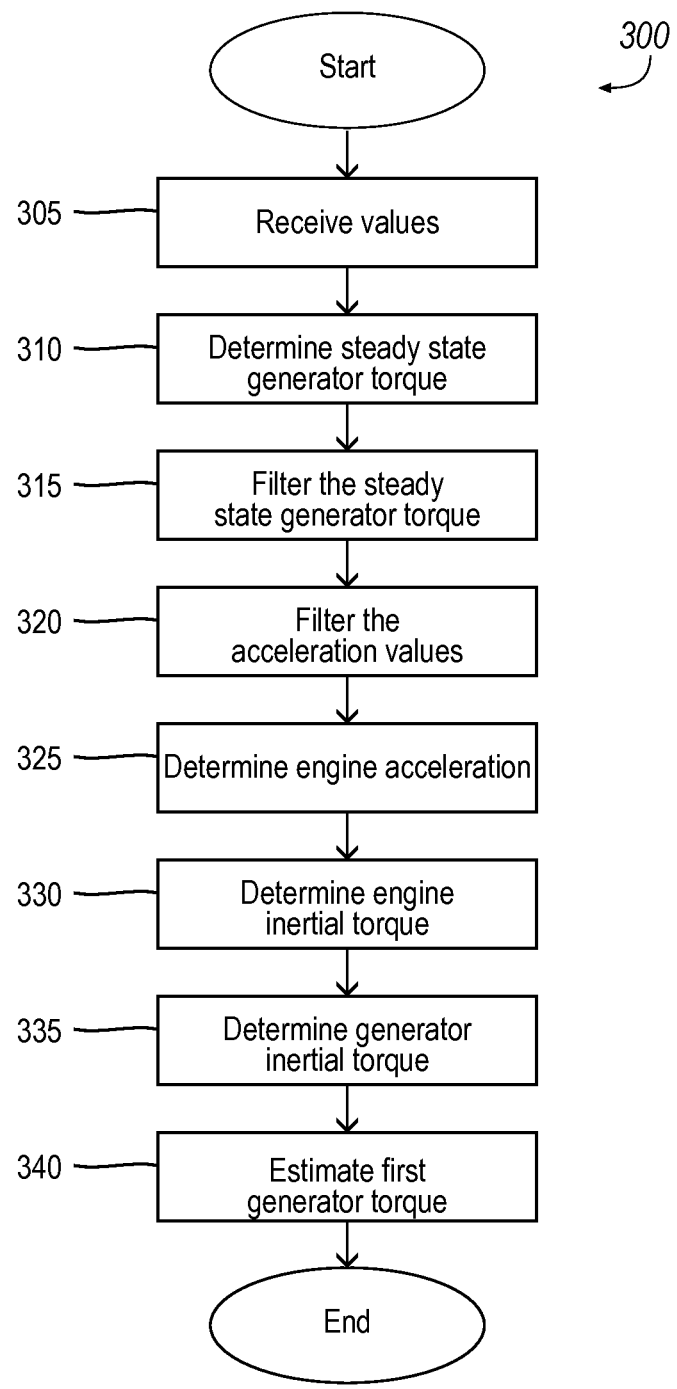
FIG. 3 is an exemplary process for estimating a first generator torque.

FIG. 3 is an exemplary process 300 for calculating the first estimated torque $T_{G1}$ based on an engine torque $T_e$ (also referred to as steady state engine torque). The relationship between the engine torque $T_e$, and the generator torque $T_g$ may be expressed as follows:

$$T_e - J_e \frac{dw_e}{dt} = \left(-T_g + J_g \frac{dw_g}{dt}\right) 1/k_{s2c} \quad \text{Eq. 4}$$

where Je is the engine effective inertia, $w_g$ is the generator speed, $w_e$ is the engine speed, $J_g$ is the generator effective inertia and $k_{s2c}$ is the sun-to-carrier gear ratio.

At block 305, the controller 170 may receive a plurality of engine, generator and motor values. These values may include the engine torque $T_e$, engine effective inertia $J_e$, the generator speed $w_g$, the engine speed $w_e$, the generator effective inertia $J_g$ and the sun-to-carrier gear ratio $k_{s2c}$. The engine torque $T_e$ may be received from an electronic control unit (ECU) within the vehicle. This value may be an estimated value based on the current state of the engine 105. The engine torque estimation $T_e$ is based on spark angle, fuel injection, air flow. The controller 170 may also receive other values such as a motor acceleration $a_m$ and the generator acceleration $a_g$. These acceleration values may be read from a sensor within the motor 110 and generator 115 such as an accelerometer. The acceleration values may also be calculated based on the change of velocity over time of the motor 110 and generator 115.

At block 310, the controller 170 may determine or calculate a steady state generator torque $T_{g\_ss}$ from the steady state engine torque estimated in the ECU. The steady state generator torque $T_{g\_ss}$ may be calculated from the engine torque $T_e$, where $T_{g\_ss} = -k_{s2c}T_e$, where $k_{s2c}$ is a constant gear ratio of sun to carrier gear.

At block 315, the steady state generator torque $T_{g\_ss}$ may be filtered to obtain a filtered steady state generator torque $T_{g\_ss\_f}$. For example a rolling average filter may be used.

At block 320, the motor acceleration $a_m$ and the generator acceleration $a_g$ are each filtered to obtain filtered accelerations $a_{m\_f}$ and $a_{g\_f}$. For example a rolling average filter may be used.

At block 325, the filtered acceleration values are used to determine or calculate an engine acceleration $a_e$.

$$a_e = \frac{dw_g}{dt}k_{s2c} + \frac{dw_m}{dt}k_{m2r}k_{r2c} \qquad \text{Eq. 5}$$

where $k_{m2r}$ is the motor-to-ring gear ratio and $k_{r2c}$ is the ring-to-carrier ratio.

At block 330, the controller 170 calculates an engine inertial torque $T_{e\_i}$ using the filtered motor acceleration $a_{m\_f}$ and filtered generator acceleration $a_{g\_f}$, where:

$$T_{e\_i} = J_e[a_{g\_f} \cdot k_{s2c} + a_{m\_f} \cdot k_{m2r} \cdot k_{r2c}] \qquad \text{Eq. 6}$$

At block 335, the controller 170 calculates a generator inertial torque $T_{g\_i}$ using the filtered generator acceleration $a_{g\_f}$, where:

$$T_{g\_i} = J_g(a_{g\_f}) \qquad \text{Eq. 7}$$

At block 340, the controller 170 adds the filtered steady state generator torque $T_{g\_ss\_f}$, the engine inertial torque $T_{e\_i}$ and the generator inertial torque $T_{g\_i}$ to determine the first estimated generator torque $T_{G1}$. Using equations 4 and 5, the first estimated generator torque $T_{G1}$ may be expressed as:

$$T_g = T_{G1} = -k_{s2c}T_e + k_{s2c}J_e(a_{g\_f}k_{s2c} + a_{m\_f}k_{m2r} \cdot k_{r2c}) + J_g \cdot a_{g\_f} \qquad \text{Eq. 8}$$

The process may then end.

Figure 4:
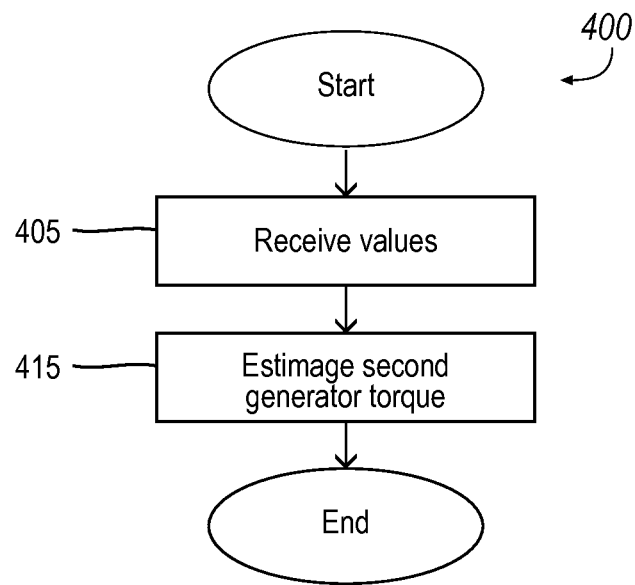
FIG. 4 is an exemplary process for estimating a second generator torque.

FIG. 4 is an exemplary process 400 for calculating the second estimated torque based on two phase currents $I_a$ & $I_b$.

At block 405, the controller 170 may receive a plurality of engine and generator values. As explained above, these values may include both constant and real-time values relating to each the generator 115 and the engine 105. The values may include two phase currents $I_a$ and $I_b$ that are converted into torque current $I_q$ and field current $I_d$ using a motor control method such as Field Oriented Control, a number of poles p, a magnet flux linkage λ and a drag torque of the generator $T_{drag}$. In one example, the drag is the load of the engine. The flux may be part of what makes up the field current $I_d$.

At block 415, the controller 170 may calculate the second estimated generator torque $T_{G2}$. The estimated generator torque $T_{G2}$ may be expressed in terms of $I_d$ and $I_q$ and calculated via the machine circuit equations representing motor behavior as follows:

$$\frac{d}{dt}(i_d) = \left(\frac{1}{L_d}\right)(v_d) - \left(\frac{R}{L_d}\right)(i_d) + \left(\frac{L_q}{L_d}\right)pw_r i_q \qquad \text{Eq. 9}$$

$$\frac{d}{dt}(i_q) = \left(\frac{1}{L_q}\right)(v_q) - \left(\frac{R}{L_q}\right)(i_q) - \left(\frac{L_d}{L_q}\right)(pw_r i_d) - \frac{\lambda pw_r}{L_q} \qquad \text{Eq. 10}$$

The estimated generator torque $T_{G2}$ may be expressed as:

$$T_{g\_tcb} = T_{G2} = \frac{3}{2}p(\lambda i_q + (L_d - L_q)i_q i_d) + T_{drag} \qquad \text{Eq. 11}$$

where:

| | |
|---|---|
| $L_q, L_d$ | q and d axis inductances |
| R | resistance of the stator windings |
| $i_q, i_d$ | q and d axis currents |
| $v_q, v_d$ | q and d axis voltages |
| $\omega_r$ | angular velocity of the rotor |
| λ | amplitude of the flux induced by the permanent magnets of the rotor in the stator phases |
| p | number of pole pairs |
| $T_{g\_tcb}$ | electromagnetic estimated generator torque |

The process may then end.

Figure 5:
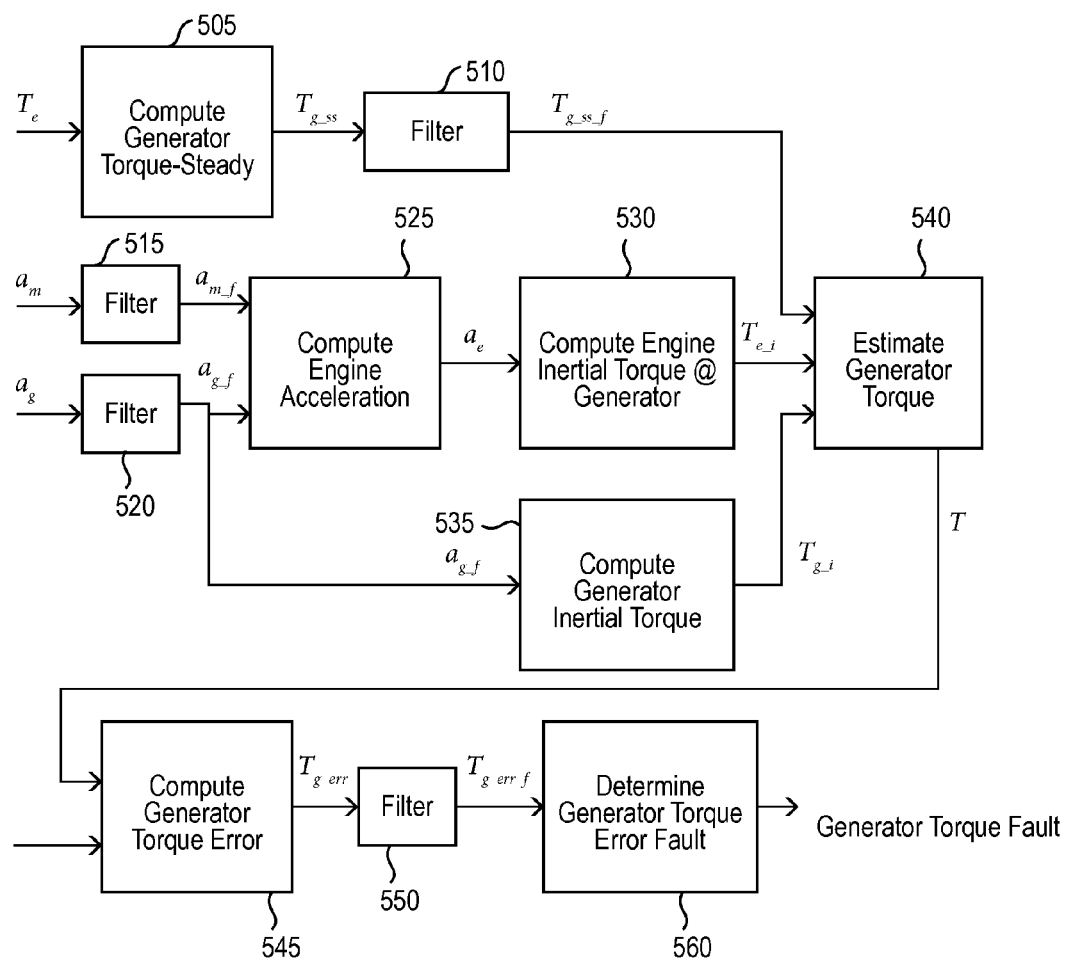
FIG. 5 is an exemplary block diagram for determining whether a generator torque fault exists.

FIG. 5 is a block diagram for determining whether a generator torque fault exists. The process described with respect to FIG. 5 may be accomplished at the controller 170 via the processor and memory. Blocks 505-540 illustrate a process similar to that described in FIG. 3 for process 300. At block 505 the controller 170 may receive a plurality of engine, generator and motor values. One of these values may be the engine torque $T_e$. The controller 170 may calculate the steady state generator torque $T_{g\_ss}$ from the engine torque $T_e$. At block 510, the steady state generator torque $T_{g\_ss}$ may be filtered. At blocks 515 and 520, the motor acceleration $a_m$ and the generator acceleration $a_g$ are each filtered to obtain $a_{m\_f}$ and $a_{g\_f}$.

At block 530, the controller 170 calculates an engine inertial torque $T_{e\_i}$ using the engine acceleration. At block 535, the controller 170 calculates a generator inertial torque $T_{g\_i}$ using the filtered generator acceleration $a_{g\_f}$. At block 540 the controller 170 may add the filtered steady state generator torque $T_{g\_ss\_f}$, the engine inertial torque $T_{e\_i}$ and the generator inertial torque $T_{g\_i}$ to determine the first estimated generator torque $T_{G1}$.

At block 545, the first and second estimated torques $T_{G1}$ and $T_{G2}$ may be compared, similar to block 215 of FIG. 2. That is, the values of equations 8 and 11 are compared. At block 550, the resultant comparison value (or torque error) $T_{g\_err}$ may be filtered. At block 560, the controller 170 may determine whether a torque error exists in response to the filtered comparison value $T_{g\_err\_f}$. This may be accomplished, as explained with respect to block 220 above, by comparing the filtered comparison value $T_{g\_err\_f}$ with a predefined threshold. If the predefined threshold is exceeded, a torque error may be determined.

Accordingly, the disclosed system may use two phase currents and an engine torque to estimate a pair of generator torques. These torques may be compared and if the compared value exceeds a threshold, a torque error may be realized. By using only a pair of phase currents, the third sensor typically necessary to establish a torque error may be eliminated. Further, the disclosed systems and methods may directly detect generator torque error, instead of only phase current imbalance.

Computing devices such as the controllers described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Matlab Simulink, TargetLink, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, EEPROM (Electrically Erasable Programmable Read-Only Memory and is a type of non-volatile memory used in computers and other electronic devices to store small amounts of data that must be saved when power is removed, e.g., calibration tables or device configuration.) optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a powertrain including an engine and a generator coupled to a driveshaft;
    an inverter configured to provide phase currents to the generator; and
    a controller programmed to output a fault condition based on first and second generator torques, the first generator torque being based on an engine torque and the second generator torque being based on no more than two phase currents of the generator.

2. The vehicle of claim 1, wherein the controller is further programmed to identify a fault condition in response to a difference between the first generator torque and the second generator torque exceeding an error threshold.

3. The vehicle of claim 1, wherein the first generator torque is further based on a motor acceleration and a generator acceleration.

4. The vehicle of claim 3, wherein the engine torque is estimated in the controller.

5. The vehicle of claim 1, wherein the second generator torque is further based on a generator magnetic flux and a generator drag torque.

6. A torque error detection system comprising:
a controller including input communication channels configured to receive an engine torque and no more than two phase currents of a generator, output communication channels configured to output a fault condition, and control logic configured to generate the fault condition in response to a difference between first and second generator torques exceeding a threshold, wherein the first generator torque is based on the engine torque and the second generator torque is based on the two currents.

7. The system of claim 6, wherein the first generator torque is further based on a motor acceleration and a generator acceleration.

8. The system of claim 7, wherein the engine torque is estimated in the controller.

9. The system of claim 6, wherein the second generator torque is further based on a generator magnetic flux and a generator drag torque.

10. A method for detecting generator torque error comprising:
outputting a fault condition in response to a difference between first and second generator torques exceeding a threshold, wherein the first torque is based on a steady state engine torque, an engine acceleration, and a generator acceleration, and wherein the second torque is based on generator phase currents.

11. The method of claim 10, wherein the second torque is based on no more than two generator phase currents.

12. The method of claim 11, wherein the second torque is further based on a generator magnetic flux and a generator drag torque.

13. The method of claim 10, further comprising estimating a steady state generator torque based on the steady state engine torque and a sun to carrier gear ratio of a planetary gear set.

14. The method of claim 10, further comprising filtering the generator acceleration and the motor acceleration, wherein the engine acceleration is based on the filtered generator acceleration and a sun to carrier gear ratio of a planetary gear set plus the filtered motor acceleration and a motor to ring gear ratio and a ring to carrier gear ratio of the planetary gear set.

15. The method of claim 14, wherein the first torque is further based on a generator inertial torque based on the filtered generator acceleration.

16. The method of claim 15, wherein the first torque is further based on an engine inertial torque based on the engine acceleration.

* * * * *